United States Patent [19]

Ferguson

[11] Patent Number: 5,751,623
[45] Date of Patent: May 12, 1998

[54] DIGITAL COMPUTER FOR ADDING AND SUBTRACTING

[75] Inventor: David E. Ferguson, Fawnskin, Calif.

[73] Assignee: Amalgamated Software of North America, Inc., San Antonio, Tex.

[21] Appl. No.: 561,785

[22] Filed: Nov. 22, 1995

[51] Int. Cl.$^6$ ........................................................ G06F 7/50
[52] U.S. Cl. ........................................................ 364/781
[58] Field of Search ................................. 364/781, 768

[56] References Cited

U.S. PATENT DOCUMENTS 5,086,406   2/1992   Okugawa et al. .................. 364/781

Primary Examiner—Tan V. Mai
Attorney, Agent, or Firm—Fish & Richardson

[57] ABSTRACT

A method and apparatus for efficiently adding and subtracting multiple digit decimal numbers represented as a series of 8-bit bytes, each 8-bit byte representing one digit of a decimal number. In accordance with the present invention, numeric values are stored internally within a computer in a new format, referred to as "X7B". Numeric input into the computer can be in any form, such as binary, ASCII, EBCDIC, X7B, etc. X7B values are computed by adding the 8-bit binary representation of each decimal digit to a binary value of "0111 1011" (i.e., "7B" hexadecimal). The invention adds or subtracts two X7B numbers by performing the following operations: (1) inputting first and second decimal numbers in X7B format as a concatenation of 8-bit values; (2) adding or subtracting the two X7B values; (3) logically AND'ing each byte of the sum or difference with the hexadecimal value "30"; (4) logically shifting the result of the logical AND operation 3 bits to the right; (5) subtracting the result of the shift operation from the sum or difference resulting from the first addition or subtraction operation; (6) logically AND'ing each byte of the preceding result with the hexadecimal value "0F"; and (7) outputting the value in simple binary coded decimal format (i.e., all four leading bits of each byte are "0") or in X7B format (by adding hexadecimal "7B" to each byte of the final value).

20 Claims, 3 Drawing Sheets

REGISTERS

| | | |
|---|---|---|
| $1928_{X7B}$ | 1 | 7C847D83 |
| $3476_{X7B}$ | 2 | 7E7F8281 |
| T | 3 | 30303030 |
| N | 4 | 0F0F0F0F |
| X7B | 5 | 7B7B7B7B |

STACK

| | |
|---|---|
| Y | |
| X | FB040004 |

(1) 1928+3476 => X

| | |
|---|---|
| Y | FB040004 |
| X | FB040004 |

(2) PUSH X => Y

| | |
|---|---|
| Y | FB040004 |
| X | 30000000 |

(3) X AND T => X

| | |
|---|---|
| Y | FB040004 |
| X | 06000000 |

(4) SHIFT X RIGHT 3

| | |
|---|---|
| Y | |
| X | F5040004 |

(5) Y - X => X

| | |
|---|---|
| Y | |
| X | 05040004 |

(6) X AND N => X

| | |
|---|---|
| Y | |
| X | 807F7B7F |

(7) X + X7B => X
(optional)

FIG. 1

REGISTERS

| | | |
|---|---|---|
| $1928_{X7B}$ | 1 | 7C847D83 |
| $3476_{X7B}$ | 2 | 7E7F8281 |
| T | 3 | 30303030 |
| N | 4 | 0F0F0F0F |
| X7B | 5 | 7B7B7B7B |

STACK

| Y | |
|---|---|
| X | FE04FB02 |

(1) 1928−3476 => X

| Y | FE04FB02 |
|---|---|
| X | FE04FB02 |

(2) PUSH X => Y

| Y | FE04FB02 |
|---|---|
| X | 30003000 |

(3) X AND T => X

| Y | FE04FB02 |
|---|---|
| X | 06006000 |

(4) SHIFT X RIGHT 3

| Y | |
|---|---|
| X | F804F502 |

(5) Y − X => X

| Y | |
|---|---|
| X | 08040502 |

(6) X AND N => X

| Y | |
|---|---|
| X | 837F807D |

(7) X + X7B => X
(optional)

FIG. 2

DIGITAL COMPUTER FOR ADDING AND SUBTRACTING

BACKGROUND OF THE INVENTION

1. Field of the Invention

This invention relates to a method and apparatus for performing numerical calculations within a digital computer, and more particularly, a method and apparatus for performing efficient decimal addition and subtraction in a digital computer.

2. Description of Related Art

Digital computers have been used to perform mathematical calculations for many years. Due to the architecture of digital computers, there are some difficulties that need to be addressed when performing decimal mathematics in a digital computer. One way of representing decimal numbers in a digital computer is to represent all values in pure binary form. However, it is difficult to represent decimal fractions as pure binary numbers. For example, the number "10.1" in decimal is equal to the repeating binary number 1010.0001 1001 1001 1001 1001 1001 1001 1001 . . . In general, accuracy is lost when such non-integer decimal numbers are converted to binary form.

Because of the inaccuracies inherent in representing decimal numbers in pure binary form, a different method of representing binary numbers has been developed over the years, known as "binary coded decimal" (BCD). In a conventional binary coded decimal system, each decimal digit is precisely represented as a multi-bit binary symbol. All arithmetic operations on such BCD numbers are then performed using conventional decimal algorithms, taking into account the true binary form of each decimal digit. Such BCD coding allows precise calculation of decimal numbers to virtually any degree of precision desired, including allowing the representation of numbers that are larger than the largest number that could be represented in pure binary form.

For example, in a computer having a 16-bit wide word, single precision arithmetic limits the largest integer that can be represented in pure binary form to 65,536. Even in computers using "double precision" operations, in which each value can be represented by up to twice the number of bits normally available by using two words per value, precision can be lost when performing mathematical operations on binary representations of decimal values. In contrast, using BCD numbers, a number of any size can be represented simply by concatenating the necessary number of BCD symbols. More importantly, BCD numbers can be used to accurately represent decimal fractional values with any desired degree of accuracy. Another advantage of BCD numbers is that they are easy to directly output for print or display.

Since each digit of a decimal value represents only 10 different values, only 4 bits (binary digits) are actually needed to represent any one decimal digit in BCD format. Arithmetic done on decimal numbers represented in common 8-bit formats (a "byte") is called "zoned arithmetic" because a BCD digit is typically represented in the right-most 4 bits (referred to as the numeric portion, or simply as the "numeric") of a byte. The remaining left-most 4 bits are referred to as the "zone" portion of the byte. Two commonly used formats for zoned numbers in use today are "EBCDIC" (Extended Binary Coded Decimal Information Code) and "ASCII" (American Standard Code for Information Interchange). ASCII is used in virtually all non-IBM computers. EBCDIC is used on most IBM computers (except personal computers and the RS6000).

An argument has existed in industry as to which format, ASCII or EBCDIC, provides the more efficient format for multi-byte (e.g., 4 bytes or more) arithmetic operations (the operation which is mostly commonly performed in a computer). EBCDIC is slightly more efficient (i.e., performs the same operation in less time by executing fewer instructions) than ASCII due to the fact that correct zone values can be re-established by a simple logical OR operation. The best computers using EBCDIC currently require 7 operations to subtract or add two 32-bit numbers represented in EBCDIC format. The best computers using ASCII currently require 8 operations to subtract or add two 32-bit numbers represented in ASCII format.

Another format which has been used in the past to represent decimal values in binary form is referred to as "packed" representation. In accordance with packed representation, 4 bits within an 8-bit byte are used to represent one decimal digit, and two decimal digits are "packed" into each byte. Such packing was an important way of conserving scarce memory resources in older computer designs. One method for packing decimal digits used in the past was to offset the value of each decimal digit by 3 within a packed byte. This representation is referred to as "binary excess three" (referred to as "X3"). For example, the number "54" represented in packed X3 form equals "1000 0111" rather than "0101 0100". The advantage of X3 representation is that the ten's complement of each decimal number is the same as the two's complement of that number. For example, the ten's complement of "4" (X3 "0111") is "6" (10 minus 4, or X3 "1001"). The two's complement of X3 "0111" is "1001" (invert all bits of "0111" to get "1000" and add one to get the two's complement "1001"). In addition, the nine's complement of an X3 decimal number is the same as the one's complement of that number. For example, the nine's complement of "4" is "5". The one's complement of X3 "0111" is "1000".

In almost all modern computers, negative numbers are represented as the complement of the absolute value of that number. Complimenting decimal numbers is very common in modern computers. By representing packed decimal numbers in a form that provides for easy computation of two's complement or one's complement numbers, the X3 system has certain significant implementation advantages over BCD arithmetic using ASCII or EBCDIC formats, which require that ten's complement or nine's complement operations be performed. Both hardware and software computations of two's complement or one's complement numbers is simple compared to computing the ten's complement or nine's complement of a BCD number. For example, conversion of an ASCII representation of a decimal number to the ASCII representation of the nine's or ten's complement of that decimal number typically requires 8 fixed-point machine instructions. Similarly, conversion of an EBCDIC representation of a decimal number to the EBCDIC representation of the nine's or ten's complement of that number typically requires 7 fixed-point machine instructions. In comparison, computing the one's or two's complement of an X3 number typically requires as few as one fixed-point machine operation.

The number of operations required to subtract or add two numbers in a computer directly affects the computational speed of a computer. What is needed is a BCD representation that is more efficient than prior art representations in performing multi-byte mathematical operations. More particularly, it would be desirable to provide a computer that can add and subtract 8-bit BCD representations of decimal digits with fewer than 7 operations. Furthermore, it would be desirable to provide a computer that can represent decimal digits in 8-bit representations which allow the decimal values to be easily and rapidly complemented.

The present invention provides a method and apparatus that meets these needs.

SUMMARY OF THE INVENTION

The present invention is a method and apparatus for efficiently adding and subtracting multiple digit decimal numbers represented as a series of 8-bit bytes, each 8-bit byte representing one digit of a decimal number. In accordance with the present invention, adding and subtracting is performed by a computer in as few as 6 fixed-point operations. Furthermore, the present invention allows digital representations of decimal numbers to be complemented in one fixed-point machine operation.

In accordance with the present invention, numeric values are stored internally within a computer in a new format, referred to as "X7B". Numeric input into the computer can be in any form, such as binary, ASCII, EBCDIC, X7B, etc. X7B values are computed by adding the 8-bit binary representation of each decimal digit to a binary value of "0111 1011" (i.e., "7B" hexadecimal). Multi-byte values in X7B format can be added or subtracted according to a relatively short 6-operation process, including three conventional binary addition or subtraction operations, two logical AND operations, and one logical shift operation. The result is the X7B representation of the sum of (or difference between) the first and second value. If the result of the addition of (or subtraction between) the first and second values is negative, the resulting X7B value will be an X7B representation of the complement of the absolute value of the decimal result. Accordingly, a computer in accordance with the present invention is spared the task of performing additional operations to complement a negative result of an operation.

In accordance with the present invention, the inventive computer also complements decimal values represented as an 8-bit byte (X7B format) in one machine operation. That is, the result of generating the two's complement of a decimal number stored in X7B format is an X7B representation of the ten's complement of that decimal number. Likewise, the result of generating the one's complement of a decimal number stored in X7B format is an X7B representation of the nine's complement of that decimal number.

The present invention provides a very efficient apparatus and method for subtracting and adding numbers stored in X7B BCD form and having each digit represented by one 8-bit byte. The present invention also provides a very efficient apparatus and method for generating the ten's complement and the nine's complement of numbers stored in X7B BCD form and having each digit represented by one 8-bit byte.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

FIG. 1 is a chart showing the flow of register and stack operations for addition using the preferred embodiment of the present invention.

FIG. 2 is a chart showing the flow of register and stack operations for subtraction using the preferred embodiment of the present invention.

Like reference numbers and designations in the various drawings refer to like elements.

DETAILED DESCRIPTION OF THE INVENTION

Figure 3:
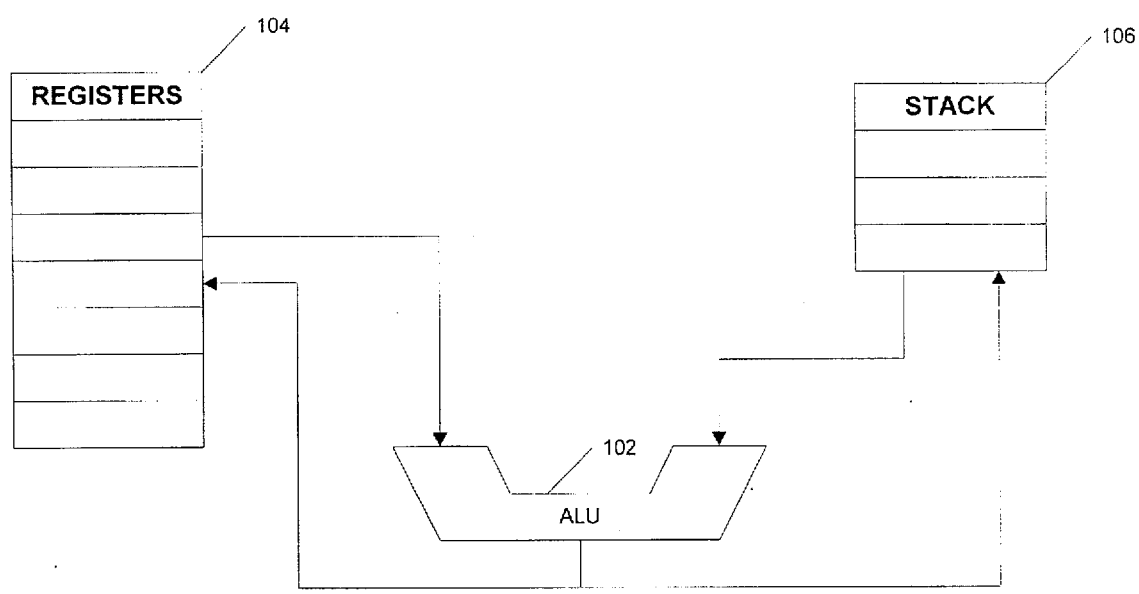
FIG. 3 is a block diagram of one embodiment of a computational apparatus in accordance with the present invention.

Throughout this description, the preferred embodiment and examples shown should be considered as exemplars, rather than as limitations on the present invention.

Principle of Operation

The invention results from the observation that an 8-bit byte can represent 256 numbers, but only 10 numbers are needed to represent any of the decimal digits. While the common ASCII and EBCDIC BCD representations only effectively use the lower four bits of an 8-bit byte, the invention utilizes the fact that an excess of 246 numbers are available after coding a BCD number. The invention uses half (123, or 0×7B in "C" programming notation) of these number representations before the 10 consecutive binary numbers used for encoding the 10 decimal digits, and half after. This novel numbering scheme is referred to as "X7B" (7B is the hexadecimal value of decimal 123), and leads to the result that the ten's complement of each decimal number in X7B format is the same as the two's complement of that number. In addition, the nine's complement of an X7B format decimal number is the same as the one's complement of that number. Input decimal values are converted to the "X7B" format by adding the 8-bit binary representation of each decimal digit to a binary value of "0111 1011" (i.e., 7B hexadecimal).

By using X7B notation, complementation is done by using the natural two's complement or one's complement operations of a binary computer, which are much faster than performing ten's or nine's complementation as required for conventional zoned BCD numbers.

An advantage of the novel X7B format over the X3 format is that 8-bit bytes are used for each decimal digit, rather than packing two decimal digits in each byte. Since modern computers are designed to handle bytes and not half-bytes ("nibbles"), the X7B format more efficiently utilizes modern computer hardware.

FIG. 1 is a chart showing the flow of register and stack operations for the preferred embodiment of the present invention. The process shown in FIG. 1 is described in the context of a computer in which values to be operated on are stored in registers (e.g., 32-bit registers), and operated on in at least a 2-level stack (e.g., a stack having at least X and Y locations). It will be recognized by one of ordinary skill in the art that the process shown in FIG. 1 may be performed with any computer that is capable of performing the operations required (ie., binary addition and subtraction, logical AND, and logical shift). It will also be recognized that other operations could be added to the process for a variety of purposes, but the process shown in FIG. 1 has been optimized to teach a minimum number of steps. It will further be recognized that the process described in FIG. 1 can be implemented in software as well as hardware, and that the operations can be done completely in registers (i.e., register-to-register operations), or in any combination of register, memory, and storage operations.

In the example shown in FIG. 1, the decimal numbers 1928 and 3476 will be added using the inventive method. It is assumed that the state of the system is that the decimal number 1928 is stored in register 1 in X7B format as a first operand, and that decimal number 3476 is stored in register 2 in X7B format as a second operand. Also stored in additional registers are a constant T, comprising hexadecimal "30" for each byte of the operands, a constant N, comprising hexadecimal "0F" for each byte of the operands, and a constant X7B comprising hexadecimal "7B" for each byte of the operands.

As noted above, the conversion from decimal number to X7B format is accomplished simply by adding the hexadecimal value "7B" to every byte position of the number. Thus, for example, decimal "1928" is transformed to X7B format by adding, in hexadecimal, "1 " to "7B" to derive "7C", and "9" to "7B" to derive "84", and so forth.

In Step (1), the two operands are fetched from their respective registers 1 and 2 and added by means of a binary addition operation, in known fashion, with the result being placed in the stack at location X.

In Step (2), the sum is pushed (i.e., copied), from the X location to the Y location of the stack.

In Step (3), the number in the X location of the stack is logically AND'd with the constant T from register 3, with the result being placed in the X location of the stack.

In Step (4), the quantity in the X location of the stack is shifted right 3 bits.

In Step (5), the value in the X location of the stack is subtracted from the value in the Y location, with the result being stored in the X location of the stack.

In Step (6), the value in the X location of the stack is logically AND'd with the constant N from register 4, with the result being stored in the X location of the stack.

It should be noted at this point that the quantity in the X location of the stack, "05040004", when read as a decimal number omitting the high order 4 bits (i.e., the leading "0" in each pair of numbers) gives the sum of the addends. That is, decimal 1928 plus decimal 3476 equals decimal 5404.

At this point, the value in the X location of the stack can be readily output as a decimal number. However, in the general case, additional operations in X7B format will be performed. Accordingly, an optional Step (7) transforms the number in the X location of the stack to an X7B number by simply adding the X7B constant from register 5, with the result being stored in the X location of the stack, as shown.

Subtraction is performed identically the same, except that in Step (1), the binary addition operation is replaced with a binary subtraction operation. FIG. 2 shows an example of subtraction using the present invention. The numbers used are the same as in the example of FIG. 1, except that decimal 3476 is subtracted from decimal 1928 in Step (1). The remaining steps proceed as described above, with the result that after Step (6), the hexadecimal value "08040502" is stored in the X location of the stack. Again, when read as a decimal number omitting the high order 4 bits, the answer to the subtraction is "8452", which represents the ten's complement of the value "1548", which is the decimal result of 1928-3476 (i.e., -1548). Note also that after performing optional Step (7) to transform the result of Step (6) back to the X7B format, the hexadecimal result, "837F807D" is the two's complement of "7C807F81", which is the X7B representation of decimal 1548.

The example shown is for 32-bit values. The operation shown in Steps (3), (6), and (7) are performed on a byte-by-byte basis. Thus, the constants in registers 3, 4, and 5 would be extended in the same pattern for operations on longer word lengths. Accordingly, the algorithm does not change if the number of digits changes.

The shift operation in Step (4) can be performed by any operation that results in the X value having been shifted 3 bits to the right, as shown. It will also be understood that due to the restricted range of X7B values, the result of the logical AND operation in Step (3) between the contents of the X location of the stack and the constant T will be a value in which each byte is either hexadecimal "30" or "00". Accordingly, it does not matter whether the shift operation in Step (4) is performed on a byte-by-byte basis, or as a word. Accordingly, the result of the shift operation in Step (4) is a value in which each byte is either hexadecimal "00" or "06".

The present invention allows a decimal number to be complemented in only one machine operation. For example, the X7B representation of decimal "1548" is complemented by the present invention merely by performing a one's complement operation on the X7B format (to result in a nine's complement of the decimal value), or a two's complement operation on the X7B format (resulting in a ten's complement of the decimal value).

Note also that, unlike most computers which perform decimal arithmetic using byte-by-byte operations, all of the bits of the bytes involved in X7B operations are operated on in parallel.

It can be seen from the above description that the inventive method illustrated in FIGS. 1 and 2 allows a programmable computer to perform addition and subtraction of decimal values represented as multi-byte binary values in a relatively short six fixed-point operation process. Accordingly, the present invention provides a substantial advantage over prior art methods, which require at least seven fixed-point operations.

Hardware Implementation

FIG. 3 is a block diagram of one embodiment of a computation apparatus that can be used for implementing the present invention. An arithmetic logic unit (ALU) 102 provides a means by which two sets of signals can be operated upon. The ALU 102 may be implemented in any manner which allows a first signal applied on parallel signal lines (preferably, a multiple of 8 signal lines) to be selectably added, subtracted, or logically AND'd with a second signal (again, preferably applied on a multiple of 8 signal lines) in a conventional bit-by-bit manner. The ALU can also perform one's and two's complement on binary numbers. In the preferred embodiment, the ALU 102 can perform shifting operations, in known fashion. Of course, some of the operations, such as shifting, may be external to the ALU 102, in known fashion. The ALU 102 may be implemented as a state machine, selectively coupled gates within a programmable array, a programmable processing device (such as a microprocessor), or as discrete logic.

In the embodiment shown, one input to the ALU 102 is provided from a set of registers 104, while the other input is provided from a stack 106. The output of the ALU 102 may be selectively coupled to the registers 104 or stack 106, in known fashion. Not shown is conventional control circuitry for determining the order of operations, the operations to be performed, and the operands and locations from and to which data is retrieved or stored.

Software Implementation

The invention may be implemented in hardware or software, or a combination of both. Preferably, the invention is implemented in computer programs executing on a programmable computer comprising a processor (including an ALU, and preferably including registers and/or a stack), a data storage system (including volatile and nonvolatile memory and/or storage devices or elements), at least one input device, and at least one output device. Data input through one or more input devices for temporary or permanent storage in the data storage system includes numbers to be added or subtracted. Program code is applied to the input data to perform the functions described above and generate output information. The output information is then output by the computer by applying it to one or more output devices or storing it in the data storage system, in known fashion.

Each such computer program is preferably stored on a storage media or device (e.g., ROM or magnetic diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

The invention can be compactly described by the following pseudocode, which uses right hand "Polish" notation. Lower case letters represent n digit arguments or units. Upper case letters represent the following constants: T=0×30 in each byte of a unit; N=0×0F in each byte of a unit; E=0×7B in each byte of a unit. The symbol & means logical AND. The symbol ± means either addition or subtraction, as selected by a user. The symbols − and + mean addition and subtraction, respectively. The symbol ↑ represents a PUSH operation for the prior quantity (i.e., make a copy on the stack). The symbol >> means right shift. The entire process shown in FIGS. 1 and 2 for adding or subtracting two X7B numbers can then be described as:

$$xy \pm \uparrow T \& 3 >> -N \& E+$$

Conclusion

As should be clear from the description given above, the present invention can be implemented on any programmable or definable electronic device programmed or wired to do the following operations: (1) input first and second decimal numbers in X7B format as a concatenation of 8-bit values; (2) add or subtract the two X7B values; (3) logically AND each byte of the sum or difference with the hexadecimal value "30"; (4) logically shift the result of the logical AND operation 3 bits to the right; (5) subtract the result of the shift operation from the sum or difference resulting from the first addition or subtraction operation; (6) logically AND each byte of the preceding result with the hexadecimal value "0F"; and (7) output the value in simple binary coded decimal format (i.e., all four leading bits of each byte are "0") or in X7B format (by adding hexadecimal "7B" to each byte of the final value).

A number of embodiments of the present invention have been described. Nevertheless, it will be understood that various modifications may be made without departing from the spirit and scope of the invention. For example, the present invention is illustrated with 32-bit wide numbers. However, words of any byte length can be used. Furthermore, while the present invention is illustrated as being implemented in particular hardware, it should be understood that the present invention may be implemented by any device that can perform the operations described above. Accordingly, it is to be understood that the invention is not to be limited by the specific illustrated embodiment, but only by the scope of the appended claims.

What is claimed is:

1. A method of operating a digital computer, which has digital circuitry, including a storage device, capable of performing arithmetic addition and subtraction operations, to reduce the number of operations performed by the digital circuitry in producing the sum or difference of two decimal numbers stored in the storage device in binary form, the method comprising:

(a) storing X7B representations of the two decimal numbers in the storage device;

(b) operating the digital circuitry to:

(1) selectively add or subtract the X7B representations of the two numbers to produce, in the storage device, a first operand;

(2) logically AND the first operand with a second operand having a hexadecimal value of "30" in each byte to produce, in the storage device, a third operand;

(3) logically shift the third operand by three bits to the right to produce, in the storage device, a fourth operand;

(4) subtract the fourth operand from the first operand to produce, in the storage device, a fifth operand; and (5) logically AND each byte of the fifth operand with a sixth operand having a hexadecimal value of "0F" in each byte to produce, in the storage device, a binary number representing the sum or difference of the two decimal numbers; and (c) delivering the binary number from its location in the storage device for use in subsequent operations of the digital computer.

2. The method of claim 1, further comprising operating the digital circuitry to add to the binary number a seventh operand having a hexadecimal value of "7B" in each byte to produce, in the storage device, an X7B representation of the binary number.

3. The method of claim 1, wherein the step of storing X7B representations of the two decimal numbers in the storage device comprises adding to each of the decimal numbers an operand having the hexadecimal value "7B" in each byte.

4. A method of operating a digital computer, which has digital circuitry, including a storage device, capable of performing efficient arithmetic addition and subtraction operations, to generate in the storage device an X7B representation of a multi-byte BCD number for use by the digital circuitry in performing an addition or subtraction operation, the method comprising:

(a) loading the multi-byte BCD number into the storage device as a first operand; and (b) operating the digital circuitry to produce, in the storage device, the X7B representation by adding to the first operand a second operand having a hexadecimal value of "7B" in each byte.

5. The method of claim 4, further comprising operating the digital circuitry to produce, in the storage device, an X7B representation of the ten's complement of the multi-byte BCD number by two's complementing the X7B representation of the multi-byte BCD number.

6. The method of claim 4, further comprising operating the digital circuitry to produce, in the storage device, an X7B representation of the nine's complement of the multi-byte BCD number by one's complementing the X7B representation of the multi-byte BCD number.

7. The method of claim 4, further comprising operating the digital circuitry to produce, in a reduced number of operations, the sum or difference of the multi-byte BCD number and another multi-byte BCD number by:

(a) selectively adding or subtracting X7B representations of the two multi-byte BCD numbers to produce, in the storage device, a first operand;

(b) logically AND'ing the first operand with a second operand having a hexadecimal value of "30" in each byte to produce, in the storage device, a third operand;

(c) logically shifting the third operand by three bits to the right to produce, in the storage device, a fourth operand;

(d) subtracting the fourth operand from the first operand to produce, in the storage device, a fifth operand; and (e) logically AND'ing each byte of the fifth operand with a sixth operand having a hexadecimal value of "0F" in each byte to produce, in the storage device, a final BCD number representing the sum or difference of the two multi-byte BCD numbers.

8. The method of claim 7, further comprising operating the digital circuitry to produce an X7B representation of the final BCD number by adding to the final BCD number an operand having a hexadecimal value of "7B" in each byte.

9. A digital computer comprising:

(a) a storage device;

(b) digital circuitry capable of performing addition and subtraction in a reduced number of operations to produce, for use in subsequent computer operations, the sum or difference of two decimal numbers stored in the storage device in binary form by:

(1) storing X7B representations of the two decimal numbers in the storage device;

(2) selectively adding or subtracting the X7B representations of the two numbers to produce, in the storage device, a first operand;

(3) logically AND'ing the first operand with a second operand having a hexadecimal value of "30" in each byte to produce, in the storage device, a third operand;

(4) logically shifting the third operand by three bits to the right to produce, in the storage device, a fourth operand;

(5) subtracting the fourth operand from the first operand to produce, in the storage device, a fifth operand;

(6) logically AND'ing each byte of the fifth operand with a sixth operand having a hexadecimal value of "0F" in each byte to produce, in the storage device, a binary number representing the sum or difference of the two decimal numbers; and (7) delivering the binary number from its location in the storage device for use in subsequent operations of the digital computer.

10. The computer of claim 9, wherein the digital circuitry is operable to produce an X7B representation of the binary number by adding to the binary number an operand having a hexadecimal value of "7B" in each byte.

11. The computer of claim 9, wherein the digital circuitry is operable to generate the X7B representations of the two decimal numbers by adding to each decimal number an operand having a hexadecimal value of "7B" in each byte.

12. A digital computer comprising:

(a) a storage device;

(b) digital circuitry operable to generate in the storage device an X7B representation of a multi-byte BCD number for use in performing an efficient arithmetic addition or subtraction operation by:

(1) loading the multi-byte BCD number into the storage device as a first operand; and (2) generating the X7B representation by adding to the first operand a second operand having a hexadecimal value of "7B" in each byte.

13. The computer of claim 12, wherein the digital circuitry is operable to produce, in the storage device, an X7B representation of the ten's complement of the multi-byte BCD number by two's complementing the X7B representation of the multi-byte BCD number.

14. The computer of claim 12, wherein the digital circuitry is operable to produce, in the storage device, an X7B representation of the nine's complement of the multi-byte BCD number by one's complementing the X7B representation of the multi-byte BCD number.

15. The computer of claim 12, wherein the digital circuitry is operable to produce, in a reduced number of operations, the sum or difference of the multi-byte BCD number and another multi-byte BCD number by:

(a) selectively adding or subtracting X7B representations of the two multi-byte BCD numbers to produce, in the storage device, a first operand;

(b) logically AND'ing the first operand with a second operand having a hexadecimal value of "30" in each byte to produce, in the storage device, a third operand;

(c) logically shifting the third operand by three bits to the right to produce, in the storage device, a fourth operand;

(d) subtracting the fourth operand from the first operand to produce, in the storage device, a fifth operand; and (e) logically AND'ing each byte of the fifth operand with a sixth operand having a hexadecimal value of "0F" in each byte to produce, in the storage device, a final BCD number representing the sum or difference of the two multi-byte BCD numbers.

16. The computer of claim 15, wherein the digital circuitry is operable to produce an X7B representation of the final BCD number by adding to the final BCD number an operand having a hexadecimal value of "7B" in each byte.

17. A computer program, fixed on a computer-readable storage medium, for use in a digital computer having digital circuitry, including a storage device, capable of performing addition and subtraction operations, the program comprising executable instructions which, when executed by the computer, allow the digital circuitry to produce, in a reduced number of operations, the sum or difference of two decimal numbers stored in the storage device in binary form by:

(a) storing X7B representations of the two decimal numbers in the storage device;

(b) selectively adding or subtracting the X7B representations of the two numbers to produce, in the storage device, a first operand;

(c) logically AND'ing the first operand with a second operand having a hexadecimal value of "30" in each byte to produce, in the storage device, a third operand;

(d) logically shifting the third operand by three bits to the right to produce, in the storage device, a fourth operand;

(e) subtracting the fourth operand from the first operand to produce, in the storage device, a fifth operand;

(f) logically AND'ing each byte of the fifth operand with a sixth operand having a hexadecimal value of "0F" in each byte to produce, in the storage device, a final binary number representing the sum or difference of the two decimal numbers; and (g) delivering the final binary number from its location in the storage device for use in subsequent operations of the digital computer.

18. The computer program of claim 17, further comprising executable instructions which, when executed by the computer, allow the digital circuitry to produce an X7B representation of the final binary number by adding to the final binary number a hexadecimal operand having a value of "7B" in each byte.

19. A computer-readable storage medium, configured with a computer program, which, when read by a digital computer having digital circuitry, including a storage device, capable of performing addition and subtraction operations, causes the computer to operate in a specific and predefined manner to produce, in a reduced number of operations, the sum or difference of two decimal numbers stored in the storage device in binary form by:

(a) storing X7B representations of the two decimal numbers in the storage device;

(b) operating the digital circuitry to:
  (1) selectively add or subtract the X7B representations of the two numbers to produce, in the storage device, a first operand;
  (2) logically AND the first operand with a second operand having a hexadecimal value of "30" in each byte to produce, in the storage device, a third operand;
  (3) logically shift the third operand by three bits to the right to produce, in the storage device, a fourth operand;
  (4) subtract the fourth operand from the first operand to produce, in the storage device, a fifth operand; and
  (5) logically AND each byte of the fifth operand with a sixth operand having a hexadecimal value of "0F" in each byte to produce, in the storage device, a final binary number representing the sum or difference of the two decimal numbers; and (c) delivering the final binary number from its location in the storage device for use in subsequent operations of the digital computer.

20. The computer-readable storage medium of claim 19, wherein the computer program, when read by a digital computer, causes the computer to produce an X7B representation of the final binary number by adding to the final binary number a hexadecimal operand having a value of "7B" in each byte.

* * * * *